United States Patent
Yang et al.

(10) Patent No.: US 10,097,530 B2
(45) Date of Patent: Oct. 9, 2018

(54) SECURITY AUTHENTICATION METHOD AND BIDIRECTIONAL FORWARDING DETECTION BFD DEVICE

(71) Applicant: Huawei Technologies Co., Ltd., Shenzhen (CN)

(72) Inventors: Peilin Yang, Nanjing (CN); Tao Han, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 216 days.

(21) Appl. No.: 15/178,770

(22) Filed: Jun. 10, 2016

(65) Prior Publication Data

US 2016/0285850 A1 Sep. 29, 2016

Related U.S. Application Data

(63) Continuation of application No. PCT/CN2014/091340, filed on Nov. 18, 2014.

(30) Foreign Application Priority Data

Dec. 13, 2013 (CN) .......................... 2013 1 0686766

(51) Int. Cl.
*H04L 12/24* (2006.01)
*H04L 29/06* (2006.01)
*H04L 29/14* (2006.01)

(52) U.S. Cl.
CPC ............. *H04L 63/08* (2013.01); *H04L 63/12* (2013.01); *H04L 63/1416* (2013.01); *H04L 69/40* (2013.01); *H04L 41/28* (2013.01)

(58) Field of Classification Search
CPC ....................................................... H04L 41/28
See application file for complete search history.

(56) References Cited

U.S. PATENT DOCUMENTS

2008/0172582 A1 7/2008 Sinicrope et al.
2009/0046723 A1* 2/2009 Rahman .................. H04L 69/16
370/395.31

(Continued)

FOREIGN PATENT DOCUMENTS

CN 101252584 A 8/2008
CN 102932318 A 2/2013

(Continued)

OTHER PUBLICATIONS

Katz, D. et al., "Bidirectional Forwarding Detection (BFD)" Internet Engineering Task Force (IETF), Request for Comments: 5880, Category: Standards Track, ISSN: 2070-1721, Juniper Networks, Jun. 2010, 49 pages.

*Primary Examiner* — Madhuri R Herzog
(74) *Attorney, Agent, or Firm* — Slater Matsil, LLP

(57) ABSTRACT

A security authentication method includes: receiving, by a control plane of a BFD device, a first BFD packet that is sent by a control plane of a peer BFD device; generating, by the control plane, a first token value according to the random nonce; sending the first token value to a data plane; receiving, by the data plane, a second BFD packet that is sent by a data plane of the peer BFD device, where the second BFD packet carries authentication information, and the authentication information includes a random nonce; and generating, by the data plane, a second token value according to the random nonce included in the authentication information and by using a calculation method the same as that of the control plane, and successfully authenticating, by the data plane, the second BFD packet if the first token value and the second token value are the same.

14 Claims, 8 Drawing Sheets

(56) References Cited

U.S. PATENT DOCUMENTS

2014/0157367 A1 6/2014 Zhang
2016/0285850 A1 9/2016 Yang et al.

FOREIGN PATENT DOCUMENTS

CN 103297400 A 9/2013
CN 103647777 A 3/2014

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Vers|  Diag   |Sta|P|F|C|A|D|M|  Detect Mult  |    Length     |
+-+-+-+-+-+-+-+-+-+-+-+-+-+-+-+-+-+-+-+-+-+-+-+-+-+-+-+-+-+-+-+-+
|                       My Discriminator                        |
+-+-+-+-+-+-+-+-+-+-+-+-+-+-+-+-+-+-+-+-+-+-+-+-+-+-+-+-+-+-+-+-+
|                      Your Discriminator                       |
+-+-+-+-+-+-+-+-+-+-+-+-+-+-+-+-+-+-+-+-+-+-+-+-+-+-+-+-+-+-+-+-+
|                    Desired Min TX Interval                    |
+-+-+-+-+-+-+-+-+-+-+-+-+-+-+-+-+-+-+-+-+-+-+-+-+-+-+-+-+-+-+-+-+
|                   Required Min RX Interval                    |
+-+-+-+-+-+-+-+-+-+-+-+-+-+-+-+-+-+-+-+-+-+-+-+-+-+-+-+-+-+-+-+-+
|                 Required Min Echo RX Interval                 |
+-+-+-+-+-+-+-+-+-+-+-+-+-+-+-+-+-+-+-+-+-+-+-+-+-+-+-+-+-+-+-+-+
```

FIG. 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Vers  |  Diag   |Sta|P|F|C|A|D|M|  Detect Mult  |    Length   |
+-+-+-+-+-+-+-+-+-+-+-+-+-+-+-+-+-+-+-+-+-+-+-+-+-+-+-+-+-+-+-+-+
|                       My Discriminator                        |
+-+-+-+-+-+-+-+-+-+-+-+-+-+-+-+-+-+-+-+-+-+-+-+-+-+-+-+-+-+-+-+-+
|                      Your Discriminator                       |
+-+-+-+-+-+-+-+-+-+-+-+-+-+-+-+-+-+-+-+-+-+-+-+-+-+-+-+-+-+-+-+-+
|                    Desired Min TX Interval                    |
+-+-+-+-+-+-+-+-+-+-+-+-+-+-+-+-+-+-+-+-+-+-+-+-+-+-+-+-+-+-+-+-+
|                   Required Min RX Interval                    |
+-+-+-+-+-+-+-+-+-+-+-+-+-+-+-+-+-+-+-+-+-+-+-+-+-+-+-+-+-+-+-+-+
|                 Required Min Echo RX Interval                 |
+-+-+-+-+-+-+-+-+-+-+-+-+-+-+-+-+-+-+-+-+-+-+-+-+-+-+-+-+-+-+-+-+
|   Auth Type   |   Auth Len    |    Authentication Data...     |
+-+-+-+-+-+-+-+-+-+-+-+-+-+-+-+-+-+-+-+-+-+-+-+-+-+-+-+-+-+-+-+-+
```

SECURITY AUTHENTICATION METHOD AND BIDIRECTIONAL FORWARDING DETECTION BFD DEVICE

CROSS-REFERENCE TO RELATED APPLICATIONS

This application is a continuation of International Application No. PCT/CN2014/091340, filed on Nov. 18, 2014, which claims priority to Chinese Patent Application No. 201310686766.5, filed on Dec. 13, 2013, both of which are hereby incorporated by reference in their entireties.

TECHNICAL FIELD

This application relates to the field of communications technologies, and in particular, to a security authentication method and a bidirectional forwarding detection BFD device.

BACKGROUND

The Bidirectional Forwarding Detection (BFD) protocol can rapidly detect a communication fault between neighboring network devices, and a network device can switch traffic over to a backup link according to the rapidly detected fault, to speed up network convergence, thereby ensuring continuation of a service, reducing impact of a device fault or link fault on the service, and improving network availability. A BFD device includes a control plane formed by a general central processing unit (CPU) processor and a data plane formed by a network processor (NP). To prevent cyberattacks, in the control plane, the BFD protocol supports three security authentication manners: (1) an authentication manner based on a simple password; (2) authentication based on message digest algorithm 5 (MD5); and (3) authentication based on Security Hash Algorithm 1 (SHA1); however, in the data plane, there is no manner of security authenticating a BFD packet by the NP yet in any prior art.

SUMMARY

In order that an NP in a data plane of a BFD device can also perform security authentication, embodiments of this application provide a security authentication method and a bidirectional forwarding detection BFD device.

According to a first aspect, a security authentication method is provided, including receiving, by a control plane of a local bidirectional forwarding detection BFD device, a first BFD packet that is sent by a control plane of a peer BFD device, where the first BFD packet carries a random nonce generated by the peer BFD device, generating, by the control plane of the local BFD device, a first token value according to the random nonce, sending, by the control plane of the local BFD device, the first token value to a data plane of the local BFD device, receiving, by the data plane of the local BFD device, a second BFD packet that is sent by a data plane of the peer BFD device, where the second BFD packet carries authentication information, and the authentication information includes a random nonce, and generating, by the data plane of the local BFD device, a second token value according to the random nonce included in the authentication information and by using a calculation method the same as that of the control plane of the local BFD device, performing comparison to determine whether the second token value is the same as the first token value, and successfully authenticating, by the data plane of the local BFD device, the second BFD packet if the second token value is the same as the first token value.

With reference to the first aspect, in a first possible implementation manner, the generating, by the control plane of the local BFD device, the first token value according to the random nonce includes generating, by the control plane of the local BFD device, the first token value according to the random nonce carried in the first BFD packet and a source Internet protocol (IP) address and a destination IP address that are included in the first BFD packet. The generating, by the data plane of the local BFD device, the second token value according to the random nonce included in the authentication information and by using a calculation method the same as that of the control plane of the local BFD device includes generating, by the data plane of the local BFD device, the second token value according to the random nonce included in the authentication information and a source IP address and a destination IP address that are included in the second BFD packet and by using a calculation method the same as that of the control plane of the local BFD device.

With reference to the first aspect or the first possible implementation manner of the first aspect, in a second possible implementation manner, the authentication information further includes a token value. Before the successfully authenticating, by the data plane of the local BFD device, the second BFD packet, the method further includes performing, by the data plane of the local BFD device, comparison to determine whether the token value included in the authentication information is the same as the first token value. The successfully authenticating, by the data plane of the local BFD device, the second BFD packet if the second token value is the same as the first token value includes successfully authenticating, by the data plane of the local BFD device, the second BFD packet if the second token value is the same as the first token value, and the token value included in the authentication information is the same as the first token value.

With reference to the first aspect or the first or second possible implementation manner of the first aspect, in a third possible implementation manner, after the generating, by the control plane of the local BFD device, the first token value, and before the receiving, by the data plane of the local BFD device, the second BFD packet that is sent by a data plane of the peer BFD device, the method further includes sending, by the control plane of the local BFD device, a response packet of the first BFD packet to the control plane of the peer BFD device, where the response packet carries the first token value, and the second token value is the first token value encapsulated in the second BFD packet.

With reference to the first aspect or any one of the first to third possible implementation manners of the first aspect, in a fourth possible implementation manner, the control plane of the local BFD device generates the first token value by using a hash algorithm.

With reference to the first aspect or any one of the first to fourth possible implementation manners of the first aspect, in a fifth possible implementation manner, the data plane of the local BFD device generates the second token value by using a hash algorithm the same as that of the control plane of the local BFD device.

With reference to the first aspect or any one of the first to fifth possible implementation manners of the first aspect, in a sixth possible implementation manner, the first BFD packet further carries an expiration time of the first token value, and the generating, by the control plane of the local BFD device, the first token value according to the random nonce includes: generating, by the control plane of the local BFD device, the first token value according to the random nonce carried in the first BFD packet, a source IP address and a destination IP address that are included in the first BFD packet, and the expiration time.

With reference to the first aspect or any one of the first to sixth possible implementation manners of the first aspect, in a seventh possible implementation manner, the control plane of the local BFD device or peer BFD device includes a general CPU processor (such as an X86 processor); and the data plane of the local BFD device or peer BFD device is also referred to as a forwarding plane, including a network processor (NP).

With reference to the first aspect or any one of the first to seventh possible implementation manners of the first aspect, in an eighth possible implementation manner, the random nonce is carried by extending fields of the first BFD packet and second BFD packet.

With reference to the first aspect or any one of the first to eighth possible implementation manners of the first aspect, in a ninth possible implementation manner, the first BFD packet further includes authentication request information, the authentication request information includes at least one of authentication request information based on Message Digest Algorithm 5 (MD5) and authentication request information based on Security Hash Algorithm 1 (SHA1), and the control plane of the local BFD device generates the first token value according to the random nonce after successfully authenticating the first BFD packet.

According to a second aspect, a security authentication method is provided, including receiving, by a control plane of a local bidirectional forwarding detection BFD device, a first BFD packet that is sent by a control plane of a peer BFD device, where the first BFD packet carries a random nonce generated by the peer BFD device, generating, by the control plane of the local BFD device, a first token value according to the random nonce, sending, by the control plane of the local BFD device, the first token value to a data plane of the local BFD device, receiving, by the data plane of the local BFD device, a second BFD packet that is sent by a data plane of the peer BFD device, where the second BFD packet carries authentication information, and the authentication information includes a second token value, and performing, by the data plane of the local BFD device, comparison to determine whether the second token value is the same as the first token value, and successfully authenticating, by the data plane of the local BFD device, the second BFD packet if the second token value is the same as the first token value.

With reference to the second aspect, in a first possible implementation manner, after the generating, by the control plane of the local BFD device, the first token value, and before the receiving, by the data plane of the local BFD device, the second BFD packet that is sent by a data plane of the peer BFD device, the method further includes sending, by the control plane of the local BFD device, a response packet of the first BFD packet to the control plane of the peer BFD device, where the response packet carries the first token value; and the second token value is the first token value encapsulated in the second BFD packet.

With reference to the second aspect or the first possible implementation manner of the second aspect, in a second possible implementation manner, the first BFD packet further includes standard authentication request information, the standard authentication request information includes at least one of authentication request information based on Message Digest Algorithm 5 MD5 and authentication request information based on Security Hash Algorithm 1 SHA1, and the standard authentication request message includes a password. The generating, by the control plane of the local BFD device, the first token value according to the random nonce includes generating, by the control plane of the local BFD device, the first token value according to the random nonce carried in the first BFD packet and the password.

With reference to the second aspect or the first possible implementation manner of the second aspect, in a third possible implementation manner, the generating, by the control plane of the local BFD device, the first token value according to the random nonce includes generating, by the control plane of the local BFD device, the first token value according to the random nonce carried in the first BFD packet and a source IP address and a destination IP address that are included in the first BFD packet.

With reference to the second possible implementation manner of the second aspect, in a fourth possible implementation manner, the generating, by the control plane of the local BFD device, the first token value according to the random nonce includes generating, by the control plane of the local BFD device, the first token value according to the random nonce carried in the first BFD packet and the password and by using a first hash algorithm.

With reference to the second aspect or the first or third possible implementation manner of the second aspect, in a fifth possible implementation manner, the generating, by the control plane of the local BFD device, the first token value according to the random nonce includes generating, by the control plane of the local BFD device, the first token value according to the random nonce carried in the first BFD packet and a source IP address and a destination IP address that are included in the first BFD packet and by using a second hash algorithm.

With reference to the second or fourth possible implementation manner of the second aspect, in a sixth possible implementation manner, the first BFD packet further carries an expiration time of the first token value, and the control plane of the local BFD device generates the first token value according to the random nonce carried in the first BFD packet, the password, and the expiration time.

With reference to the second aspect or the first or third or fifth possible implementation manner of the second aspect, in a seventh possible implementation manner, the first BFD packet further carries an expiration time of the first token value, and the control plane of the local BFD device generates the first token value according to the random nonce carried in the first BFD packet, a source IP address and a destination IP address that are included in the first BFD packet, and the expiration time.

With reference to the second or fourth or sixth possible implementation manner of the second aspect, in an eighth possible implementation manner, the first BFD packet further carries an expiration time of the first token value, and the control plane of the local BFD device generates the first token value according to the random nonce carried in the first BFD packet, the password, and the expiration time and by using a third hash algorithm.

With reference to the second aspect or the first or third or fifth or seventh possible implementation manner of the second aspect, in a ninth possible implementation manner, the first BFD packet further carries an expiration time of the token value, and the control plane of the local BFD device generates the first token value according to the random nonce carried in the first BFD packet, a source IP address and a destination IP address that are included in the first BFD packet, and the expiration time and by using a fourth hash algorithm.

With reference to the second aspect or any one of the first to ninth possible implementation manners of the second aspect, in a tenth possible implementation manner, the control plane of the local BFD device or peer BFD device includes a general CPU processor (such as an X86 processor); and the data plane of the local BFD device or peer BFD device is also referred to as a forwarding plane, including a network processor NP.

With reference to the second aspect or any one of the first to tenth possible implementation manners of the second aspect, in an eleventh possible implementation manner, the random nonce is carried by extending fields of the first BFD packet.

With reference to the second aspect or any one of the first to eleventh possible implementation manners of the second aspect, in a twelfth possible implementation manner, the second token value is carried by extending fields of the second BFD packet.

With reference to the second aspect or any one of the first to twelfth possible implementation manners of the second aspect, in a thirteenth possible implementation manner, the first BFD packet further includes authentication request information, the authentication request information includes at least one of authentication request information based on Message Digest Algorithm 5 MD5 and authentication request information based on Security Hash Algorithm 1 SHA1, and the control plane of the local BFD device generates the first token value according to the random nonce after successfully authenticating the first BFD packet.

According to a third aspect, a bidirectional forwarding detection BFD device is provided, including a control plane and a data plane, where the control plane is configured to: receive a first BFD packet that is sent by a control plane of a peer BFD device, where the first BFD packet carries a random nonce generated by the peer BFD device; generate a first token value according to the random nonce; and send the first token value to the data plane. The data plane is configured to receive a second BFD packet that is sent by a data plane of the peer BFD device, where the second BFD packet carries authentication information, and the authentication information includes a random nonce, to generate a second token value according to the random nonce included in the authentication information and by using a calculation method the same as that of the control plane, to perform comparison to determine whether the second token value is the same as the first token value, and to successfully authenticate the second BFD packet if the second token value is the same as the first token value.

With reference to the third aspect, in a first possible implementation manner, the control plane is configured to generate the first token value according to the random nonce carried in the first BFD packet and a source IP address and a destination IP address that are included in the first BFD packet. The data plane is configured to generate the second token value according to the random nonce included in the authentication information and a source IP address and a destination IP address that are included in the second BFD packet and by using a calculation method the same as that of the control plane of the BFD device.

With reference to the third aspect or the first possible implementation manner of the third aspect, in a second possible implementation manner, the authentication information further includes a token value, and the data plane is further configured to: before successfully authenticating the second BFD packet, perform comparison to determine whether the token value included in the authentication information is the same as the first token value, and successfully authenticate the second BFD packet if the second token value is the same as the first token value, and the token value included in the authentication information is the same as the first token value.

With reference to the third aspect or the first or second possible implementation manner of the third aspect, in a third possible implementation manner, the control plane includes a general CPU processor, and the data plane includes a network processor (NP).

According to a fourth aspect, a bidirectional forwarding detection BFD device is provided, including a control plane and a data plane, where the control plane is configured to receive a first BFD packet that is sent by a control plane of a peer BFD device, where the first BFD packet carries a random nonce generated by the peer BFD device, generate a first token value according to the random nonce; and send the first token value to the data plane. The data plane is configured to receive a second BFD packet that is sent by a data plane of the peer BFD device, where the second BFD packet carries authentication information, and the authentication information includes a second token value, to perform comparison to determine whether the second token value is the same as the first token value, and to successfully authenticate the second BFD packet if the second token value is the same as the first token value.

With reference to the fourth aspect, in a first possible implementation manner, the control plane is further configured to, after the first token value is generated, and before the data plane of the local BFD device receives the second BFD packet that is sent by the data plane of the peer BFD device, send a response packet of the first BFD packet to the control plane of the peer BFD device, where the response packet carries the first token value, and the second token value is the first token value encapsulated in the second BFD packet.

With reference to the fourth aspect or the first possible implementation manner of the fourth aspect, in a second possible implementation manner, the first BFD packet further includes standard authentication request information, the standard authentication request information includes at least one of authentication request information based on Message Digest Algorithm 5 MD5 and authentication request information based on Security Hash Algorithm 1 SHA1, and the standard authentication request message includes a password. The control plane is specifically configured to generate the first token value according to the random nonce carried in the first BFD packet and the password.

With reference to the fourth aspect or the first possible implementation manner of the fourth aspect, in a third possible implementation manner, the control plane is specifically configured to generate the first token value according to the random nonce carried in the first BFD packet and a source IP address and a destination IP address that are included in the first BFD packet.

With reference to the fourth aspect or any one of the first to third possible implementation manners of the fourth aspect, in a fourth possible implementation manner, the control plane includes a general CPU processor, and the data plane includes a network processor (NP).

In the embodiments of this application, a data plane of a BFD device performs token authentication on a second BFD packet by using token values, so that an NP of the data plane of the BFD device can also perform security authentication.

BRIEF DESCRIPTION OF THE DRAWINGS

FIG. 3 is a schematic diagram of a BFD packet sent by an original data plane according to an embodiment of this application;

FIG. 4 is a schematic diagram of a BFD packet sent by an original control plane according to an embodiment of this application;

DETAILED DESCRIPTION OF ILLUSTRATIVE EMBODIMENTS

To make the objectives, technical solutions, and advantages of the embodiments of this application clearer, the following clearly describes the technical solutions in the embodiments of this application with reference to the accompanying drawings in the embodiments of this application.

The following further describes the embodiments of this application in detail with reference to accompanying drawings in this specification.

Figure 1:
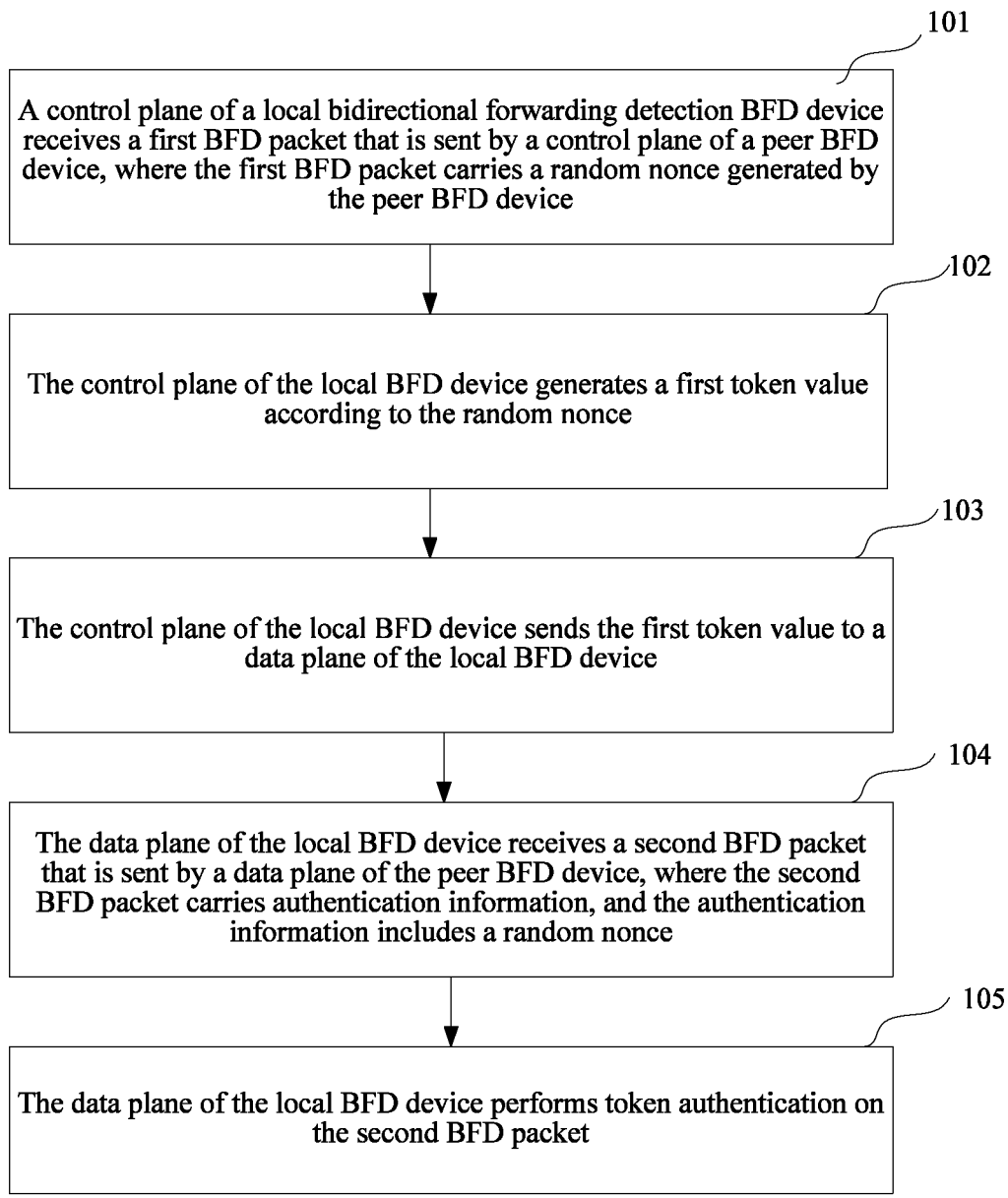
FIG. 1 is a flowchart of a security authentication method according to an embodiment of this application.

An embodiment of this application provides a security authentication method. Referring to FIG. 1, the method includes the following operations:

101: A control plane of a local bidirectional forwarding detection BFD device receives a first BFD packet that is sent by a control plane of a peer BFD device, where the first BFD packet carries a random nonce generated by the peer BFD device.

102: The control plane of the local BFD device generates a first token value according to the random nonce.

103: The control plane of the local BFD device sends the first token value to a data plane of the local BFD device.

104: The data plane of the local BFD device receives a second BFD packet that is sent by a data plane of the peer BFD device, where the second BFD packet carries authentication information, and the authentication information includes a random nonce.

105: The data plane of the local BFD device performs token authentication on the second BFD packet, where the performing, by the data plane of the local BFD device, token authentication on the second BFD packet includes: generating a second token value according to the random nonce included in the authentication information and by using a calculation method the same as that of the control plane of the local BFD device, performing comparison to determine whether the second token value is the same as the first token value, and successfully authenticating, by the data plane of the local BFD device, the second BFD packet if the second token value is the same as the first token value.

In this embodiment of this application, a data plane of a BFD device performs token authentication on a second BFD packet by using token values, so that an NP of the data plane of the BFD device can also perform security authentication.

Optionally, the generating, by the control plane of the local BFD device, the token value according to the random nonce includes:

generating, by the control plane of the local BFD device, the first token value according to the random nonce carried in the first BFD packet and a source IP address and a destination IP address that are included in the first BFD packet; and the generating, by the data plane of the local BFD device, the second token value according to the random nonce included in the authentication information and by using a calculation method the same as that of the control plane of the local BFD device includes:

generating, by the data plane of the local BFD device, the second token value according to the random nonce included in the authentication information and a source IP address and a destination IP address that are included in the second BFD packet and by using a calculation method the same as that of the control plane of the local BFD device.

Optionally, the authentication information further includes a token value;

before the successfully authenticating, by the data plane of the local BFD device, the second BFD packet, the method further includes:

performing, by the data plane of the local BFD device, comparison to determine whether the token value included in the authentication information is the same as the first token value; and the successfully authenticating, by the data plane of the local BFD device, the second BFD packet if the second token value is the same as the first token value includes:

successfully authenticating, by the data plane of the local BFD device, the second BFD packet if the second token value is the same as the first token value, and the token value included in the authentication information is the same as the first token value.

Optionally, after the generating, by the control plane of the local BFD device, the first token value, and before the receiving, by the data plane of the local BFD device, the second BFD packet that is sent by a data plane of the peer BFD device, the method further includes:

sending, by the control plane of the local BFD device, a response packet of the first BFD packet to the control plane of the peer BFD device, where the response packet carries the first token value; and the second token value is the first token value encapsulated in the second BFD packet.

Optionally, the control plane of the local BFD device generates the first token value by using a hash algorithm.

Optionally, the data plane of the local BFD device generates the second token value by using a hash algorithm the same as that of the control plane of the local BFD device.

Optionally, the first BFD packet further carries an expiration time of the first token value, and the generating, by the control plane of the local BFD device, the first token value according to the random nonce includes: generating, by the control plane of the local BFD device, the first token value according to the random nonce carried in the first BFD packet, a source IP address and a destination IP address that are included in the first BFD packet, and the expiration time.

Optionally, the control plane of the local BFD device or peer BFD device includes a general CPU processor (such as an X86 processor); and the data plane of the local BFD device or peer BFD device is also referred to as a forwarding plane, including a network processor NP.

Optionally, the random nonce is carried by extending fields of the first BFD packet and second BFD packet.

Optionally, the first BFD packet further includes standard authentication request information, the standard authentication request information includes at least one of authentication request information based on Message Digest Algorithm 5 MD5 and authentication request information based on Security Hash Algorithm 1 SHA1, and the control plane of the local BFD device generates the first token value according to the random nonce after successfully authenticating the first BFD packet.

Figure 2:
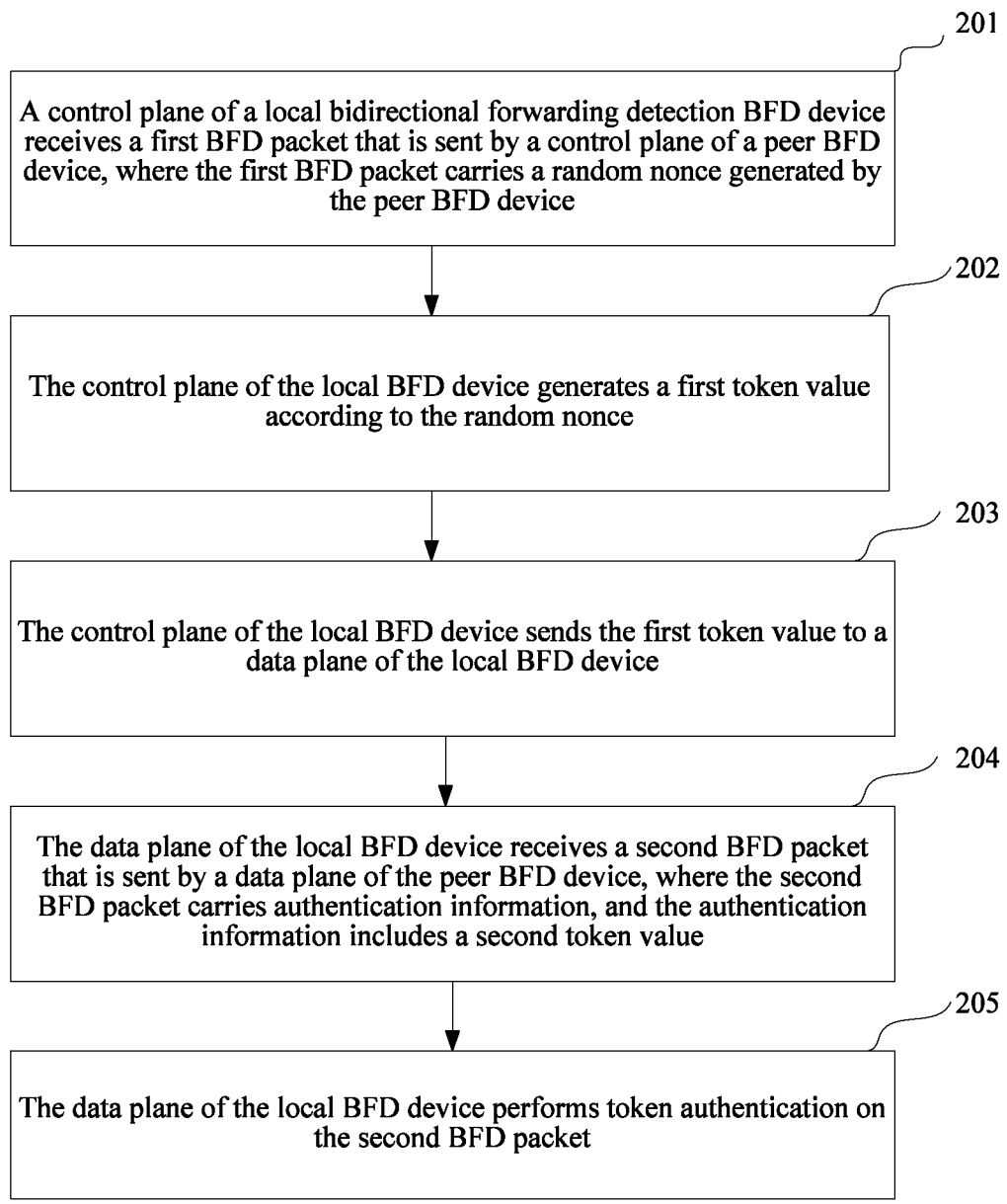
FIG. 2 is a flowchart of another security authentication method according to an embodiment of this application.

An embodiment of this application provides another security authentication method. Referring to FIG. 2, the method includes the following operations:

201: A control plane of a local bidirectional forwarding detection BFD device receives a first BFD packet that is sent by a control plane of a peer BFD device, where the first BFD packet carries a random nonce generated by the peer BFD device.

202: The control plane of the local BFD device generates a first token value according to the random nonce.

203: The control plane of the local BFD device sends the first token value to a data plane of the local BFD device.

204: The data plane of the local BFD device receives a second BFD packet that is sent by a data plane of the peer BFD device, where the second BFD packet carries authentication information, and the authentication information includes a second token value.

205: The data plane of the local BFD device performs token authentication on the second BFD packet, where the performing, by the data plane of the local BFD device, token authentication on the second BFD packet includes: performing, by the data plane of the local BFD device, comparison to determine whether the second token value is the same as the first token value, and successfully authenticating, by the data plane of the local BFD device, the second BFD packet if the second token value is the same as the first token value. After the generating, by the control plane of the local BFD device, the first token value, and before the receiving, by the data plane of the local BFD device, the second BFD packet that is sent by a data plane of the peer BFD device, the method further includes:

sending, by the control plane of the local BFD device, a response packet of the first BFD packet to the control plane of the peer BFD device, where the response packet carries the first token value; and the second token value is the first token value encapsulated in the second BFD packet.

The first BFD packet further includes standard authentication request information, the standard authentication request information includes at least one of authentication request information based on Message Digest Algorithm 5 MD5 and authentication request information based on Security Hash Algorithm 1 SHA1, and the standard authentication request message includes a password; and the generating, by the control plane of the local BFD device, the first token value according to the random nonce includes:

generating, by the control plane of the local BFD device, the first token value according to the random nonce carried in the first BFD packet and the password.

Optionally, the generating, by the control plane of the local BFD device, the first token value according to the random nonce includes:

generating, by the control plane of the local BFD device, the first token value according to the random nonce carried in the first BFD packet and a source IP address and a destination IP address that are included in the first BFD packet.

Optionally, the generating, by the control plane of the local BFD device, the first token value according to the random nonce includes:

generating, by the control plane of the local BFD device, the first token value according to the random nonce that is carried in the first BFD packet and the password that is included in the standard authentication request information and by using a first hash algorithm.

Optionally, the generating, by the control plane of the local BFD device, the first token value according to the random nonce includes:

generating, by the control plane of the local BFD device, the first token value according to the random nonce carried in the first BFD packet and a source IP address and a destination IP address that are included in the first BFD packet and by using a second hash algorithm.

Optionally, the first BFD packet further carries an expiration time of the first token value, and the control plane of the local BFD device generates the first token value according to the random nonce carried in the first BFD packet, the password, and the expiration time.

Optionally, the first BFD packet further carries an expiration time of the first token value, and the control plane of the local BFD device generates the first token value according to the random nonce carried in the first BFD packet, a source IP address and a destination IP address that are included in the first BFD packet, and the expiration time.

Optionally, the first BFD packet further carries an expiration time of the first token value, and the control plane of the local BFD device generates the first token value according to the random nonce carried in the first BFD packet, a source IP address and a destination IP address that are included in the first BFD packet, and the expiration time and by using a third hash algorithm.

Optionally, the first BFD packet further carries an expiration time of the token value, and the control plane of the local BFD device generates the first token value according to the random nonce carried in the first BFD packet, a source IP address and a destination IP address that are included in the first BFD packet, and the expiration time and by using a fourth hash algorithm.

Optionally, the control plane of the local BFD device or peer BFD device includes a general CPU processor (such as an X86 processor); and the data plane of the local BFD device or peer BFD device is also referred to as a forwarding plane, including a network processor NP.

Optionally, the random nonce is carried by extending fields of the first BFD packet.

Optionally, the second token value is carried by extending fields of the second BFD packet.

Optionally, the first BFD packet further includes standard authentication request information, the standard authentication request information includes at least one of authentication request information based on Message Digest Algorithm 5 MD5 and authentication request information based on Security Hash Algorithm 1 SHA1, and the control plane of the local BFD device generates the first token value according to the random nonce after successfully authenticating the first BFD packet.

Figure 5:
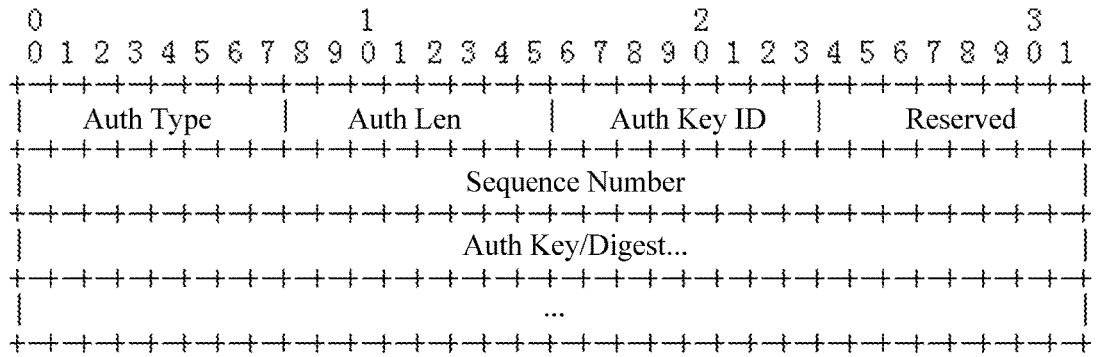
FIG. 5 is a schematic diagram of an MD5 authentication field in a BFD packet sent by an original control plane according to an embodiment of this application.
Figure 6:
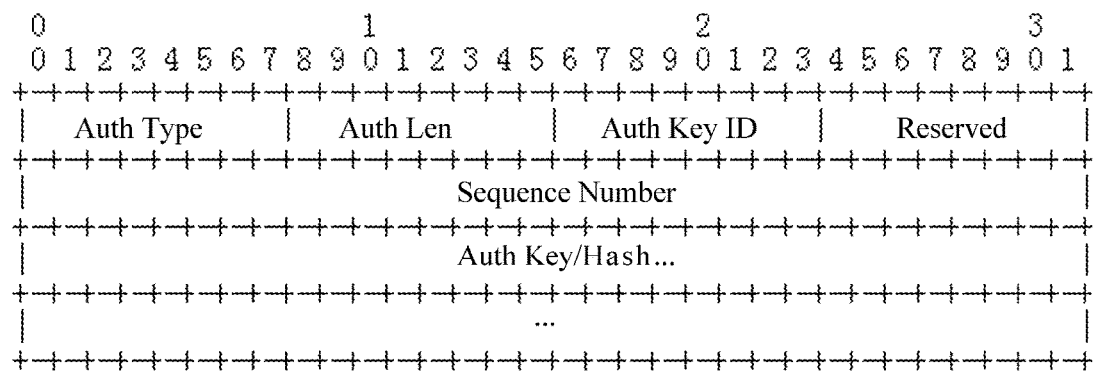
FIG. 6 is a schematic diagram of an SHA1 authentication field in a BFD packet sent by an original control plane according to an embodiment of this application.
Figure 7:
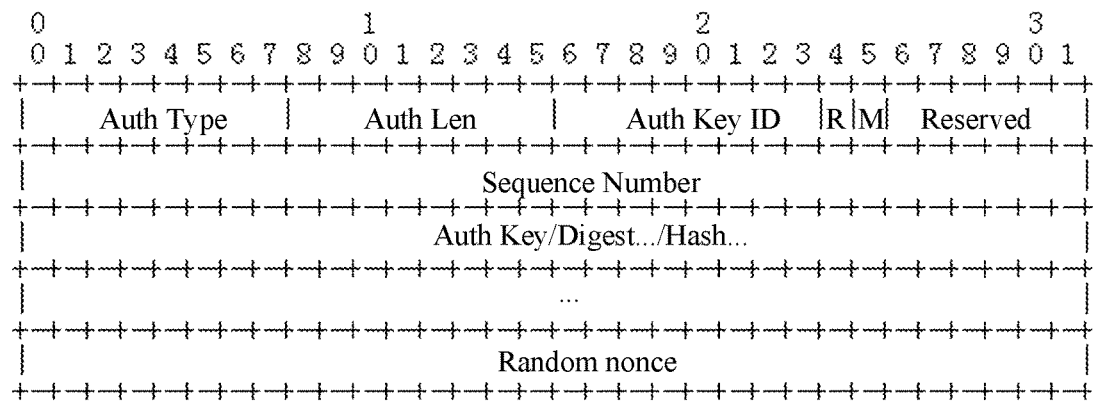
FIG. 7 is a schematic diagram of a BFD packet carrying a random nonce and sent by an extended control plane according to an embodiment of this application.
Figure 8:
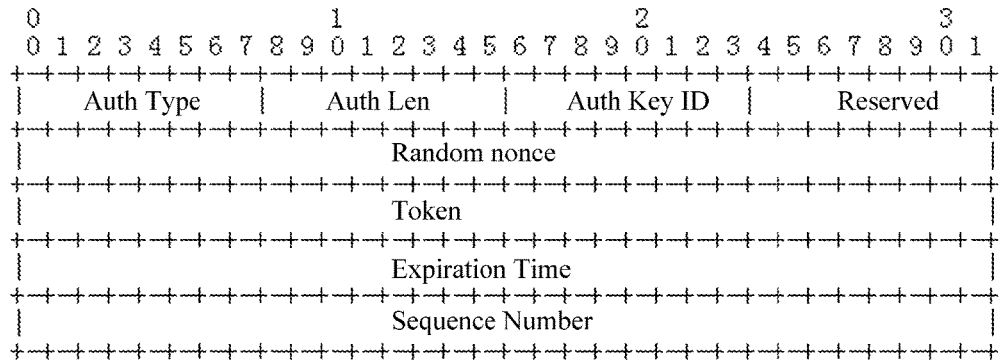
FIG. 8 is a schematic diagram of a BFD packet carrying a random nonce and/or a token value and sent by an extended data plane according to an embodiment of this application.

FIG. 3 shows a BFD packet sent by an original data plane; FIG. 4 shows a BFD packet sent by an original control plane, and a difference between the packet and the BFD packet that is sent by the original data plane shown in FIG. 3 is that an MD5/SHA1 authentication field is added in the packet; FIG. 5 and FIG. 6 present details of authentication fields in the BFD packet shown in FIG. 4; FIG. 7 shows a BFD packet that is sent by an extended control plane, where the BFD packet carries a random nonce, where a random nonce Random nonce field is added to original authentication types (for example, Auth Type based on MD 5 or SHA1 is 2/3/4/5), and to be compatible with a previous protocol, one bit R is reserved in an original 8-bit reserved field, and used to represent Random nonce, that is, if a value of R is 1, it indicates that Random nonce exists, and M of 1 bit represents message type of a request message or a response message; and FIG. 8 shows a BFD packet sent by an extended data plane in this embodiment of this application, where the BFD packet carries at least one of a random nonce and a token value, where a new authentication type Auth Type: Token Auth is newly added, for example, the type is 6, and in this type, either of the fields Random nonce and Token exists or both exist at the same time, and Expiration Time or Sequence Number may also exist.

Figure 9:
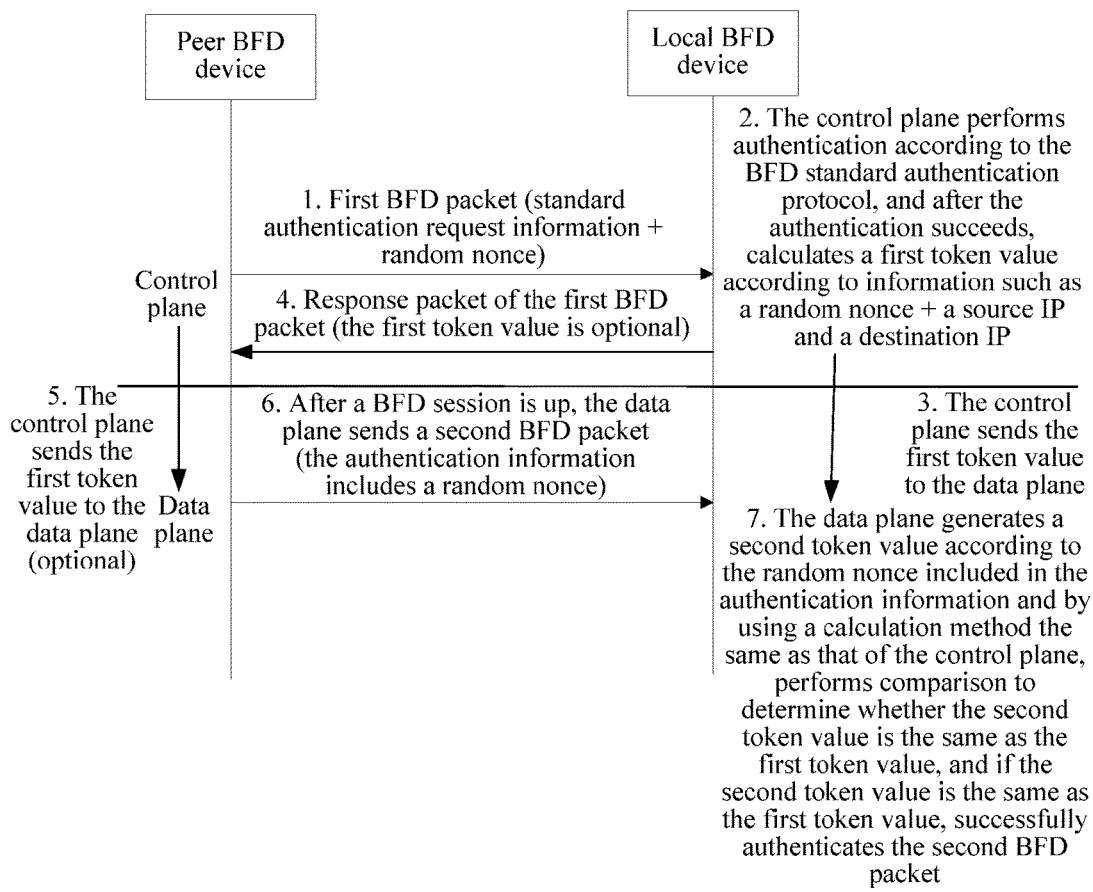
FIG. 9 is a schematic flowchart of a security authentication method according to an embodiment of this application.

The following describes, with reference to FIG. 9, a security authentication method provided in an embodiment of this application.

Step 1: A control plane of a peer BFD device sends a first BFD packet that includes standard authentication request information (for example, Auth Type based on MD5 or SHA1 is 2/3/4/5) to a control plane of a local BFD device, where the first BFD packet further carries a random nonce generated by the peer BFD device, and the first BFD packet may further carry an expiration time Expiration Time or a Sequence Number.

Step 2: The control plane of the local BFD device calculates a first token value according to the random nonce and by using a hash algorithm after successfully authenticating the first BFD packet, where the first token value may be generated according to the random nonce, and a source IP address and a destination IP address that are included in the first BFD packet, or may be generated according to the random nonce, a source IP address and a destination IP address that are included in the second BFD packet, and the expiration time.

Step 3: The control plane of the local BFD device sends the first token value to a data plane of the local BFD device.

Step 4: The control plane of the local BFD device sends the first token value to the control plane of the peer BFD device by using a response packet of the first BFD packet, where this step is optional, that is, the first token value may not be sent.

Step 5: The control plane of the peer BFD device sends the received first token value to the data plane, where this step is also optional, that is, if step 3 is not performed, step 4 is not performed either.

Step 6: After a BFD session is up, the data plane of the peer BFD device sends the second BFD packet encapsulated with the random nonce Random nonce to the data plane of the local BFD device.

When step 4 and step 5 are performed, the second BFD packet may also include a token value.

Step 7: The data plane of the local BFD device generates a second token value according to the random nonce included in the authentication information and by using a calculation method the same as that of the control plane of the local BFD device, and performs comparison to determine whether the second token value is the same as the first token value, and the data plane of the local BFD device successfully authenticates the second BFD packet if the second token value is the same as the first token value.

The data plane of the local BFD device may generate the second token value according to the random nonce included in the authentication information and a source IP address and a destination IP address that are included in the second BFD packet and by using a hash algorithm the same as that of the control plane, or the data plane of the local BFD device generates the second token value according to the random nonce included in the authentication information, a source IP address and a destination IP address in the second BFD packet, and the expiration time and by using a hash algorithm the same as that of the control plane.

When the authentication information further includes a token value, before the successfully authenticating, by the data plane of the local BFD device, the second BFD packet, the method further includes:

performing, by the data plane of the local BFD device, comparison to determine whether the token value included in the authentication information is the same as the first token value sent by the control plane of the local BFD device, and if a comparison result is that the two are the same, successfully authenticating, by the data plane of the local BFD device, the second BFD packet.

When the first token value expires, the foregoing steps 1 to 7 are re-performed.

Figure 10:
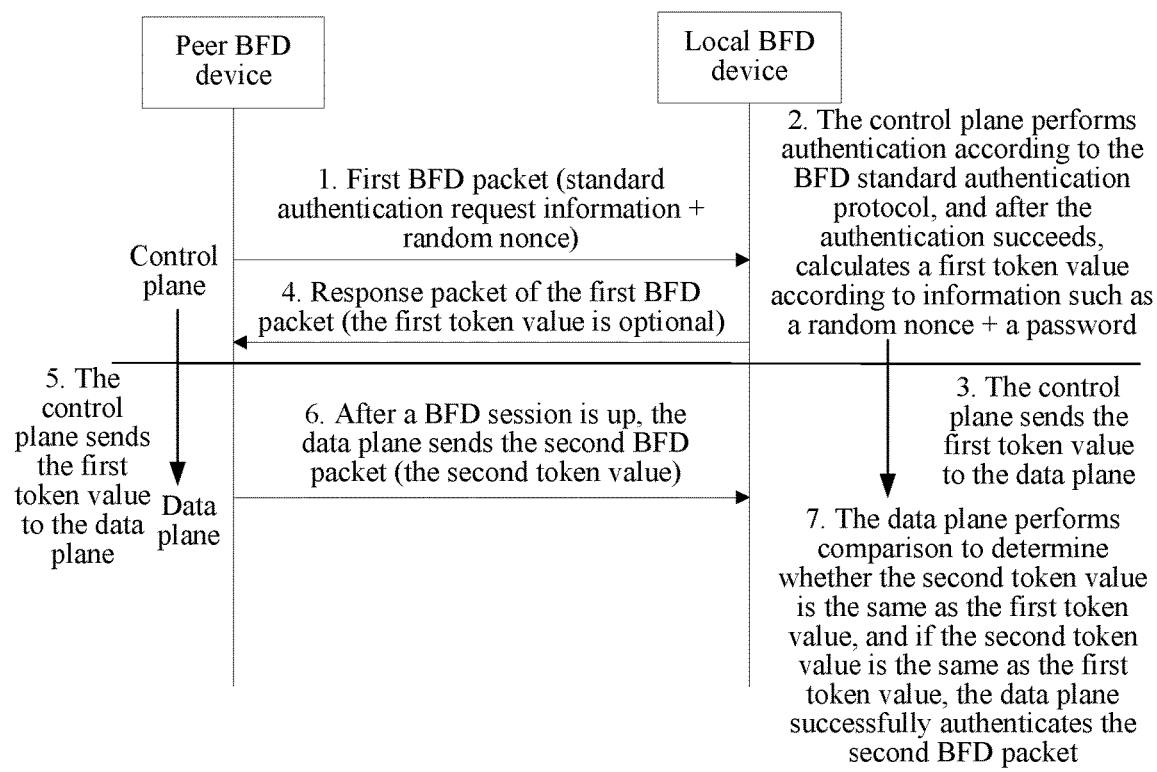
FIG. 10 is a schematic flowchart of a security authentication method according to an embodiment of this application.

The following describes, with reference to FIG. 10, another security authentication method provided in an embodiment of this application.

Step 1: A control plane of a peer BFD device sends a first BFD packet that includes standard authentication request information (for example, Auth Type based on MD5 or SHA1 is 2/3/4/5) to a control plane of a local BFD device, where the first BFD packet further carries a random nonce generated by the peer BFD device, and the first BFD packet may further carry an expiration time Expiration Time or a Sequence Number.

Step 2: The control plane of the local BFD device calculates a first token value according to the random nonce by using a hash algorithm after successfully authenticating the first BFD packet, where the first token value may be generated according to the random nonce and a password that is included in the standard authentication request information, or may be generated according to the random nonce, the password that is included in the standard authentication request information, and the expiration time Expiration Time.

Step 3: The control plane of the local BFD device sends the first token value to a data plane of the local BFD device.

Step 4: The control plane of the local BFD device sends the first token value to the control plane of the peer BFD device by using a response packet of the first BFD packet.

A sequence of the foregoing steps 3 and 4 may be interchanged, which is not limited in this embodiment of this application, and belongs to the protection scope of this embodiment of this application.

Step 5: The control plane of the peer BFD device sends the received first token value to the data plane.

Step 6: After a BFD session is up, the data plane of the peer BFD device sends the second BFD packet encapsulated with the second token value to the data plane of the local BFD device.

Step 7: The data plane of the local BFD device performs comparison to determine whether the second token value is the same as the received first token value sent by the control plane, and if the second token value is the same as the first token value, the data plane of the local BFD device successfully authenticates the second BFD packet.

After the token expires, the foregoing steps 1 to 7 are re-performed.

Figure 11:
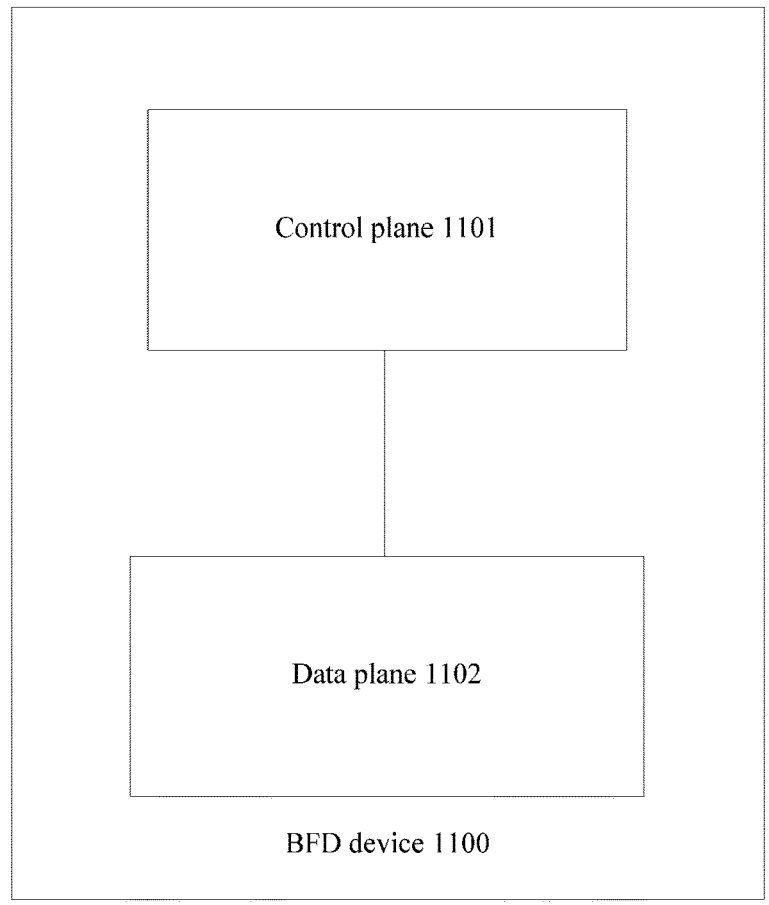
FIG. 11 is a schematic structural diagram of a bidirectional forwarding detection BFD device according to an embodiment of this application.

As shown in FIG. 11, an embodiment of this application further provides a bidirectional forwarding detection BFD device 1100, including a control plane 1101 and a data plane 1102.

The control plane 1101 is configured to: receive a first BFD packet that is sent by a control plane of a peer BFD device, where the first BFD packet carries a random nonce generated by the peer BFD device; generate a first token value according to the random nonce; and send the first token value to the data plane 1102.

The data plane 1102 is configured to: receive a second BFD packet that is sent by a data plane of the peer BFD device, where the second BFD packet carries authentication information, and the authentication information includes a random nonce; generate a second token value according to the random nonce included in the authentication information and by using a calculation method the same as that of the control plane; perform comparison to determine whether the second token value is the same as the first token value; and successfully authenticate the second BFD packet if the second token value is the same as the first token value.

Optionally, the control plane is specifically configured to generate the first token value according to the random nonce carried in the first BFD packet and a source IP address and a destination IP address that are included in the first BFD packet; and the data plane is specifically configured to generate the second token value according to the random nonce included in the authentication information and a source IP address and a destination IP address that are included in the second BFD packet and by using a calculation method the same as that of the control plane of the BFD device.

Optionally, the authentication information further includes a token value, and the data plane is further configured to: before successfully authenticating the second BFD packet, perform comparison to determine whether the token value included in the authentication information is the same as the first token value; and successfully authenticate the second BFD packet if the second token value is the same as the first token value, and the token value included in the authentication information is the same as the first token value.

Optionally, the control plane includes a general CPU processor; and the data plane includes a network processor NP.

An embodiment of this application further provides a bidirectional forwarding detection BFD device, including a control plane and a data plane.

The control plane is configured to: receive a first BFD packet that is sent by a control plane of a peer BFD device, where the first BFD packet carries a random nonce generated by the peer BFD device; generate a first token value according to the random nonce; and send the first token value to the data plane.

The data plane is configured to: receive a second BFD packet that is sent by a data plane of the peer BFD device, where the second BFD packet carries authentication information, and the authentication information includes a second token value; perform comparison to determine whether the second token value is the same as the first token value; and successfully authenticate the second BFD packet if the second token value is the same as the first token value.

Optionally, the control plane is further configured to: after the first token value is generated, and before the data plane of the local BFD device receives the second BFD packet that is sent by the data plane of the peer BFD device, send a response packet of the first BFD packet to the control plane of the peer BFD device, where the response packet carries the first token value, and the second token value is the first token value encapsulated in the second BFD packet.

Optionally, the first BFD packet further includes standard authentication request information, the standard authentication request information includes at least one of authentication request information based on Message Digest Algorithm 5 MD5 and authentication request information based on Security Hash Algorithm 1 SHA1, and the standard authentication request message includes a password; and the control plane is specifically configured to generate the first token value according to the random nonce carried in the first BFD packet and the password.

Optionally, the control plane is specifically configured to generate the first token value according to the random nonce carried in the first BFD packet and a source IP address and a destination IP address that are included in the first BFD packet.

Optionally, the control plane includes a general CPU processor; and the data plane includes a network processor NP.

Figure 12:
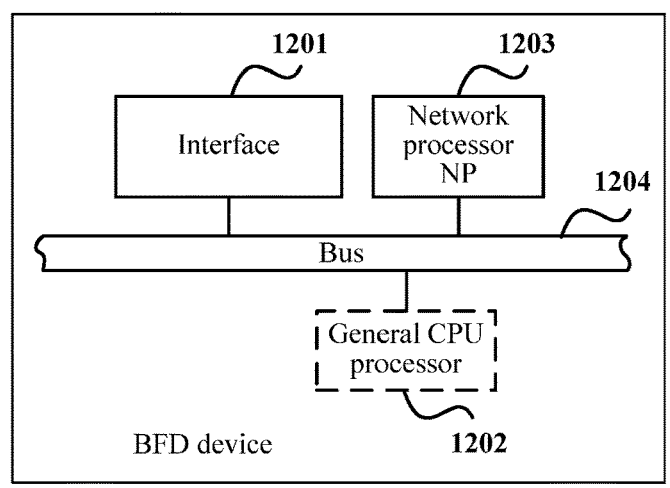
FIG. 12 is a schematic structural diagram of a bidirectional forwarding detection BFD device according to an embodiment of this application.
Figure 13:
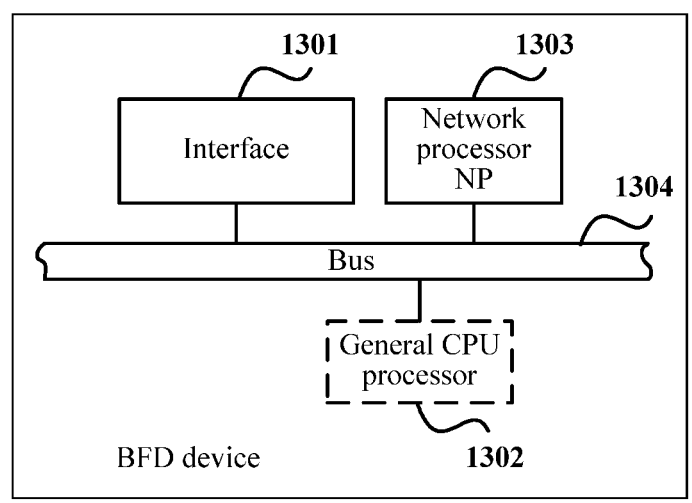
FIG. 13 is a schematic structural diagram of a bidirectional forwarding detection BFD device according to an embodiment of this application.

As shown in FIG. 12, an embodiment of this application further provides a bidirectional forwarding detection BFD device, including an interface 1201, a general CPU processor 1202, a network processor 1203, and a bus 1204, where the interface 1201, the general CPU processor 1202, and the network processor 1203 are connected and perform mutual communication by using the bus 1204.

The bus 1204 may be an industry standard architecture (ISA) bus, a peripheral component interconnect (PCI) bus, or an extended industry standard architecture (EISA) bus, or the like. The bus 1204 may be classified into an address bus, a data bus, a control bus, and the like. For the ease of representation, the bus is represented only by a line in the figure, but it does not indicate that there is only one bus or only one type of bus.

The interface 1201 receives a first BFD packet sent by a control plane of a peer BFD device, where the first BFD packet carries a random nonce generated by the peer BFD device.

The general CPU processor 1202 is configured to generate a first token value according to the random nonce; and send the first token value to the network processor 1203.

The interface 1201 is further configured to receive a second BFD packet sent by a data plane of the peer BFD device, where the second BFD packet carries authentication information, and the authentication information includes a random nonce.

The network processor 1203 is configured to generate a second token value according to the random nonce included in the authentication information and by using a calculation method the same as that of the general CPU processor 1202, perform comparison to determine whether the second token value is the same as the first token value, and if the second token value is the same as the first token value, successfully authenticate the second BFD packet.

Optionally, the general CPU processor 1202 is specifically configured to generate the first token value according to the random nonce carried in the first BFD packet and a source IP address and a destination IP address that are included in the first BFD packet.

Optionally, the network processor 1203 is specifically configured to generate the second token value according to the random nonce included in the authentication information and a source IP address and a destination IP address that are included in the second BFD packet and by using a calculation method the same as that of the control plane of the BFD device.

Optionally, the authentication information further includes a token value, and the network processor 1203 is further configured to: before successfully authenticating the second BFD packet, perform comparison to determine whether the token value included in the authentication information is the same as the first token value; and successfully authenticate the second BFD packet if the second token value is the same as the first token value, and the token value included in the authentication information is the same as the first token value.

An embodiment of this application further provides a bidirectional forwarding detection BFD device, including an interface 1301, a general CPU processor 1302, a network processor 1303, and a bus 1304, where the interface 1301, the general CPU processor 1302 and the network processor 1303 are connected and perform mutual communication by using the bus 1304.

The bus 1304 may be an ISA bus, a PCI bus, or an EISA bus, or the like. The bus 1204 may be classified into an address bus, a data bus, a control bus, and the like. For the ease of representation, the bus is represented only by a line in the figure, but it does not indicate that there is only one bus or only one type of bus.

The interface 1301 receives a first BFD packet sent by a control plane of a peer BFD device, where the first BFD packet carries a random nonce generated by the peer BFD device.

The general CPU processor 1302 is configured to generate a first token value according to the random nonce; and send the first token value to the network processor 1303.

The interface 1301 is further configured to receive a second BFD packet sent by a data plane of the peer BFD device, where the second BFD packet carries authentication information, and the authentication information includes a token value.

The network processor 1303 is configured to perform comparison to determine whether the second token value is the same as the first token value, and if the second token value is the same as the first token value, successfully authenticate the second BFD packet.

Optionally, the general CPU processor 1302 is further configured to: after the first token value is generated, and before the network processor 1303 receives the second BFD packet that is sent by the data plane of the peer BFD device, send a response packet of the first BFD packet to the control plane of the peer BFD device, where the response packet carries the first token value, and the second token value is the first token value encapsulated in the second BFD packet.

Optionally, the first BFD packet further includes standard authentication request information, the standard authentication request information includes at least one of authentication request information based on Message Digest Algorithm 5 MD5 and authentication request information based on Security Hash Algorithm 1 SHA1, and the standard authentication request message includes a password; and the general CPU processor 1302 is specifically configured to generate the first token value according to the random nonce carried in the first BFD packet and the password.

Optionally, the general CPU processor 1302 is specifically configured to generate the first token value according to the random nonce carried in the first BFD packet and a source IP address and a destination IP address that are included in the first BFD packet.

In this embodiment of this application, a data plane of a BFD device performs token authentication on a second BFD packet by using token values, so that an NP of the data plane of the BFD device can also perform security authentication.

A person of ordinary skill in the art may be aware that, in combination with the examples described in the embodiments disclosed in this specification, modules and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing apparatus, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the functional module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all of the modules may be selected according to actual requirements to achieve the objectives of the solutions of the embodiments.

In addition, functional modules in the embodiments of this application may be integrated into one processing module, or each of the modules may exist alone physically, or two or more modules are integrated into one module.

When the functions are implemented in the form of a software functional module and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A security authentication method, comprising:
receiving, by a control plane of a local bidirectional forwarding detection (BFD) device, a first BFD packet that is sent by a control plane of a peer BFD device, wherein the first BFD packet carries a random nonce generated by the peer BFD device;
generating, by the control plane of the local BFD device, a first token value according to the random nonce;
sending, by the control plane of the local BFD device, the first token value to a data plane of the local BFD device;
receiving, by the data plane of the local BFD device, a second BFD packet that is sent by a data plane of the peer BFD device, wherein the second BFD packet carries authentication information, and the authentication information comprises a random nonce;
generating, by the data plane of the local BFD device, a second token value according to the random nonce comprised in the authentication information and by using a calculation method that is the same as a calculation method of the control plane of the local BFD device; and
successfully authenticating, by the data plane of the local BFD device, the second BFD packet when the second token value is the same as the first token value.

2. The method according to claim 1, wherein the generating, by the control plane of the local BFD device, the first token value according to the random nonce comprises:
generating, by the control plane of the local BFD device, the first token value according to the random nonce carried in the first BFD packet and a source internet protocol (IP) address and a destination IP address that are comprised in the first BFD packet; and
wherein the generating, by the data plane of the local BFD device, the second token value according to the random nonce comprised in the authentication information and by using a calculation method that is the same as the calculation method of the control plane of the local BFD device comprises:
generating, by the data plane of the local BFD device, the second token value according to the random nonce comprised in the authentication information and a source IP address and a destination IP address that are comprised in the second BFD packet and by using a calculation method that is the same as the calculation method of the control plane of the local BFD device.

3. The method according to claim 1, wherein the authentication information further comprises a token value; and
wherein the successfully authenticating, by the data plane of the local BFD device, the second BFD packet when the second token value is the same as the first token value comprises successfully authenticating, by the data plane of the local BFD device, the second BFD packet when the second token value is the same as the first token value, and the token value comprised in the authentication information is the same as the first token value.

4. A security authentication method, comprising:
receiving, by a control plane of a local bidirectional forwarding detection (BFD) device, a first BFD packet that is sent by a control plane of a peer BFD device, wherein the first BFD packet carries a random nonce generated by the peer BFD device;
generating, by the control plane of the local BFD device, a first token value according to the random nonce;
sending, by the control plane of the local BFD device, the first token value to a data plane of the local BFD device;
receiving, by the data plane of the local BFD device, a second BFD packet that is sent by a data plane of the peer BFD device, wherein the second BFD packet carries authentication information, and the authentication information comprises a second token value; and
successfully authenticating, by the data plane of the local BFD device, the second BFD packet when the second token value is the same as the first token value.

5. The method according to claim 4, wherein the method further comprises sending, by the control plane of the local BFD device after the generating the first token value, and before the receiving the second BFD packet, a response packet of the first BFD packet to the control plane of the peer BFD device, wherein the response packet carries the first token value; and
wherein the second token value is the first token value encapsulated in the second BFD packet.

6. The method according to claim 4, wherein the first BFD packet further comprises standard authentication request information, wherein the standard authentication request information comprises at least one of authentication request information based on Message Digest Algorithm 5 (MD5) and authentication request information based on Security Hash Algorithm 1 (SHA1), and wherein the standard authentication request information comprises a password; and
wherein the generating, by the control plane of the local BFD device, the first token value according to the random nonce comprises generating, by the control plane of the local BFD device, the first token value according to the random nonce carried in the first BFD packet and the password.

7. The method according to claim 4, wherein the generating, by the control plane of the local BFD device, the first token value according to the random nonce comprises generating, by the control plane of the local BFD device, the first token value according to the random nonce carried in the first BFD packet and a source IP address and a destination IP address that are comprised in the first BFD packet.

8. A bidirectional forwarding detection (BFD) device, comprising:
a control plane, wherein the control plane comprises a general central processing unit (CPU) processor; and
a data plane, wherein the data plane comprises a network processor (NP);
wherein the control plane is configured to:

receive a first BFD packet that is sent by a control plane of a peer BFD device, wherein the first BFD packet carries a random nonce generated by the peer BFD device;

generate a first token value according to the random nonce; and send the first token value to the data plane; and wherein the data plane is configured to:

receive a second BFD packet that is sent by a data plane of the peer BFD device, wherein the second BFD packet carries authentication information, and wherein the authentication information comprises a random nonce;

generate a second token value according to the random nonce comprised in the authentication information and by using a calculation method that is the same as a calculation method of the control plane; and successfully authenticate the second BFD packet when the second token value is the same as the first token value.

9. The BFD device according to claim 8, wherein the control plane is configured to generate the first token value according to the random nonce carried in the first BFD packet and a source IP address and a destination IP address that are comprised in the first BFD packet; and wherein the data plane is configured to generate the second token value according to the random nonce comprised in the authentication information and a source IP address and a destination IP address that are comprised in the second BFD packet and by using a calculation method that is the same as the calculation method of the control plane of the BFD device.

10. The BFD device according to claim 8, wherein the authentication information further comprises a token value; and wherein the data plane is further configured to successfully authenticate the second BFD packet when the second token value is the same as the first token value and the token value comprised in the authentication information is the same as the first token value.

11. A bidirectional forwarding detection (BFD) device, comprising:

a control plane, wherein the control plane comprises a general central processing unit (CPU) processor; and a data plane, wherein the data plane comprises a network processor (NP);

wherein the control plane is configured to:

receive a first BFD packet that is sent by a control plane of a peer BFD device, wherein the first BFD packet carries a random nonce generated by the peer BFD device; generate a first token value according to the random nonce; and send the first token value to the data plane; and wherein the data plane is configured to:

receive a second BFD packet that is sent by a data plane of the peer BFD device, wherein the second BFD packet carries authentication information, and wherein the authentication information comprises a second token value; and successfully authenticate the second BFD packet when the second token value is the same as the first token value.

12. The BFD device according to claim 11, wherein the control plane is further configured to, send a response packet of the first BFD packet to the control plane of the peer BFD device after the first token value is generated, and before the data plane receives the second BFD packet that is sent by the data plane of the peer BFD device, wherein the response packet carries the first token value, and wherein the second token value is the first token value encapsulated in the second BFD packet.

13. The BFD device according to claim 11, wherein the first BFD packet further comprises standard authentication request information, wherein the standard authentication request information comprises at least one of authentication request information based on Message Digest Algorithm 5 (MD5) and authentication request information based on Security Hash Algorithm 1 (SHA1), and wherein the standard authentication request information comprises a password; and wherein the control plane is configured to generate the first token value according to the random nonce carried in the first BFD packet and the password.

14. The BFD device according to claim 11, wherein the control plane is configured to generate the first token value according to the random nonce carried in the first BFD packet and a source Internet protocol (IP) address and a destination IP address that are comprised in the first BFD packet.

* * * * *